(12) United States Patent
Dietrich (10) Patent No.: US 6,272,389 B1
(45) Date of Patent: *Aug. 7, 2001

(54) METHOD AND SYSTEM FOR CAPACITY ALLOCATION IN AN ASSEMBLY ENVIRONMENT

(75) Inventor: Brenda Lynn Dietrich, Yorktown Heights, NY (US)

(73) Assignee: International Business Machines Corporation, Armonk, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,755

(22) Filed: Feb. 13, 1998

(51) Int. Cl.[7] .................................. G06F 19/00
(52) U.S. Cl. .................. 700/101; 700/107; 700/106
(58) Field of Search .............. 700/99, 100, 101, 700/102, 36, 107, 103, 108; 395/500.23; 705/8–10; 709/104

(56) References Cited

U.S. PATENT DOCUMENTS

| | | | | |
|---|---|---|---|---|
| 5,216,593 | * | 6/1993 | Dietrich et al. | 700/100 |
| 5,440,675 | * | 8/1995 | Matsunaga et al. | 345/440 |
| 5,548,518 | * | 8/1996 | Dietrich et al. | 700/99 |
| 5,808,914 | * | 9/1998 | Shin et al. | 703/2 |
| 5,963,911 | * | 10/1999 | Walker et al. | 705/7 |
| 5,971,585 | * | 10/1999 | Dangat et al. | 700/102 |

* cited by examiner

Primary Examiner—William Grant
Assistant Examiner—Kidest Bahta
(74) Attorney, Agent, or Firm—Stephen C. Kaufman, Esq; McGinn & Gibb, PLLC (57) ABSTRACT

A method suitable for producing a production plan that is feasible with respect to capacity availability. The method includes the steps of reading an end product demand and capacity availability information; selecting a specific demand derived from the end product demand and comprising an end product, a time period, and a quantity; determining whether the quantity can be produced in the time periods using the available capacity and surplus capacity from earlier periods; and, recording the amount of capacity used in each time period to produce this quantity; thereby enabling realization of end product demand when an imbalance of demand and capacity exists.

20 Claims, 5 Drawing Sheets

METHOD AND SYSTEM FOR CAPACITY ALLOCATION IN AN ASSEMBLY ENVIRONMENT

BACKGROUND OF THE INVENTION

This invention relates to a novel capacity allocation method and system suitable for generating a production schedule.

INTRODUCTION TO THE INVENTION

Allocation methods for generating a production plan or schedule are known, and are preferably used in conjunction with conventional Material Requirement Planning (mrp) or Manufacturing Resource Planning (MRP) systems. Allocation methods may also be used with detailed finite scheduling systems, for generating aggregate schedules that are feasible with respect to material availability and aggregate capacity constraints. Reference on these points is made in U.S. Pat. No. 5,548,518, incorporated by reference herein.

SUMMARY OF THE INVENTION

We have discerned that traditional Manufacturing Resource Planning (MRP) systems can provide for only limited consideration of the manufacturing capacity. Subsumed Capacity Requirements Planning (CRP) modules, included in most commercial systems, use a simple offset-and-net calculation to evaluate a Master Production Schedule (MPS), to determine whether there is enough capacity at key work centers in order to produce the specified quantities of product in the specified time periods. This offset-and-net method, in turn, assumes fixed lead-times between the production of subassemblies and the production of high-level items that use these subassemblies. Now, in the event of insufficient capacity, a CRP system module can identify capacity shortages, but can not provide information as to how to address these shortages.

Our work addresses this situation, in the following way. In particular, and in sharp contrast to the intent and purview of the illustrative CRP system module approach, we note that even when CRP indicates capacity shortages in some periods, if there are also capacity surpluses for the same resources in earlier time periods, it may still be possible to determine a production plan that achieves the same end item production as specified by the MPS.

To this end, we disclose a novel method, which requires only slightly more computational effort than standard MRP logic. This novel method is most appropriate for use in an assembly environment, and can be incorporated into standard Manufacturing Resource Planning systems. An important aspect of this method is that, when it detects that there is not enough capacity to build the required quantity of product in the specified time period, it can determine how much of the product can be built in the specified time period, and then consider the possibility of building the rest of product in earlier periods. When the bill-of-materials (BOM) of the product has multiple levels, as is typical in an assembly environment where subassemblies are carried as stock, the novel method also considers building subassemblies earlier than specified by the BOM offsets, to allow for efficient use of available manufacturing capacity.

Accordingly, in a first aspect, we disclose a method suitable for producing a production plan that is feasible with respect to capacity availability, the method comprising:

(1) reading an end product demand and capacity availability information;

(2) selecting a specific demand derived from the end product demand and comprising an end product, a time period, and a quantity;

(3) determining whether the quantity can be produced in the time periods using the available capacity and surplus capacity from earlier periods; and (4) recording the amount of capacity used in each time period to produce this quantity; thereby enabling realization of end product demand when an imbalance of demand and capacity exists.

In a second aspect, we disclose an allocation method for utilization within a computer for generating a feasible production plan, the method comprising the computer implemented steps of:

(1) reading an end product demand comprising a part number p, a quantity q, and a time period t, and reading capacity availability information for periods 1 through t;

(2) determining a planned quantity of production $q'(t)$ less than or equal to the quantity q of the part number p that can be produced in the period t from subassemblies with available capacity;

(3) updating the capacity by subtracting the capacity required to produce this planned quantity $q'$;

(4) if possible, moving any remaining requirement $q-q'$ to successively earlier periods;

(5) repeating steps 2 and 3 until time t is exhausted thereby computing $q'(t-1), q'(t-2), \ldots, q'(1)$;

(6) exploding the planned quantities of production $q'(t), q'(t-1), \ldots, q'(1)$ of p through the bill of material of p to determine the requirements for each of the subassemblies $p'$ of p in each time period $t'$;

(7) repeating steps 1–5 for each part $p'$ used in p and each time period $t'$ until all requirements have been satisfied or no additional production is possible; and (8) reporting whether the quantity q can be produced by period t.

In a third aspect, we disclose a system suitable for producing a production plan that is feasible with respect to capacity availability, the system comprising:

(1) means for reading an end product demand and capacity availability information;

(2) means for selecting a specific demand derived from the end product demand and comprising an end product, a time period, and a quantity;

(3) means for determining whether the quantity can be produced in the time periods using the available capacity and surplus capacity from earlier periods; and (4) means for recording the amount of capacity used in each time period to produce this quantity; thereby enabling realization of end product demand when an imbalance of demand and capacity exists.

The novel method and system as defined can realize several significant advantages. The novel method and system can directly address and solve an important problem related to production planning. The method can be incorporated into a MRP system, taking advantage of existing database and reporting facilities. The method can also be combined with the method disclosed by Dietrich and Wittrock in U.S. Pat. No. 5,548,518, to produce production plans that are both material and capacity feasible, and which can take advantage of available capacity by building products and subassemblies earlier than required when insufficient capacity exists to build these parts in the required time frame.

BRIEF DESCRIPTION OF THE DRAWING

The invention is illustrated in the accompanying drawings, in which.

DETAILED DESCRIPTION OF THE INVENTION

A problem solved by the invention is contrasted with the prior art and illustrated through the use of an example. To this end, FIGS. 1–5 (numerals 10–94) are invoked for reference and instruction. Some basic concepts of MRP are discussed in the example; these details are given in the book, *Manufacturing Planning and Control Systems*, by T. E. Vollmann, W. L. Berry, and D. C. Whybark (1992 3rd ed., Irwin, Homewood, Ill.).

Consider the simple case of one product, P1, which has two level-1 subassemblies, P2 and P3, and two level-2 subassemblies P4 and P5. The bill-of material information is given in the following chart.

TABLE 1

Bill of Material Data

| product part number | component part number | usage rate | offset |
|---|---|---|---|
| P1 | P2 | 1 | 1 week |
| P1 | P3 | 1 | 2 weeks |
| P2 | P4 | 1 | 1 week |
| P3 | P4 | 1 | 1 week |
| P3 | P5 | 1 | 1 week |

Table 1 indicates that to produce one unit of part P1 requires one unit of part P2 and one unit of part P3, and that P2 requires one week before the completion of P1, while P2 is required two weeks before the completion of P1.

Manufacturing each of these parts requires the use of capacity resources, denoted C1, C2, C3, C4, C5, and C6. These capacities could be machines, work center, or skilled labor. For convenience, the capacity resources are often referred to simply as resources, and the available supply of a capacity resources is often referred to as its capacity. The capacity requirements are given in the following Table 2.

TABLE 2

Resource requirements by part.

|  | C1 | C2 | C3 | C4 | C5 | C6 |
|---|---|---|---|---|---|---|
| P1 | 1 | 1 | 0 | 0 | 0 | 0 |
| P2 | 0 | 0 | 1 | 0 | 0 | 0 |
| P3 | 0 | 0 | 1 | 1 | 0 | 0 |
| P4 | 0 | 0 | 0 | 0 | 1 | 0 |
| P5 | 0 | 0 | 0 | 0 | 1 | 1 |

Table 2 indicates that manufacturing P1 requires one unit of capacity C1 and one unit of capacity C2. Manufacturing P2 requires only one unit of C3, while manufacturing P3 requires one unit of C3 and one unit of C4. Manufacturing P4 requires one unit of C5, and manufacturing P5 requires one unit of each of C5 and C6.

In this example, we consider a six week planning horizon, with a demand for 50 units of P1 in week 5 and 50 units of P1 in week 6. In MRP systems, the demand for the end product P1 (called an independent demand) is first exploded to determine the corresponding requirements for the subassemblies P2, P3, P4, and P4 (called dependent demands). The logic behind the explosion is straightforward: it requires multiplying the demand of a product by the usage rate of a component, and adjusting the requirement period by the offset, and subtracting any existing stock. For example, if 50 units of P1 are required in week 5, then 50 units of P2 must be available in week 4 and 50 units of P3 must be available in week 3.

The requirements (independent and dependent demands) are given in the following Table 3.

TABLE 3

Total requirements for parts

|  | week 1 | week 2 | week 3 | week 4 | week 5 | week 6 |
|---|---|---|---|---|---|---|
| P1 | 0 | 0 | 0 | 0 | 50 | 50 |
| P2 | 0 | 0 | 0 | 50 | 50 | 0 |
| P3 | 0 | 0 | 50 | 50 | 0 | 0 |
| P4 | 0 | 50 | 100 | 50 | 0 | 0 |
| P5 | 0 | 50 | 50 | 0 | 0 | 0 |

The capacity requirements planning (CRP) module of the MRP system uses these part requirements to compute capacity requirements. Again, a simple arithmetic procedure is used. The requirements are shown in the following Table 4.

TABLE 4

Capacity Requirements

|  | week 1 | week 2 | week 3 | week 4 | week 5 | week 6 | TOTAL |
|---|---|---|---|---|---|---|---|
| C1 | 0 | 0 | 0 | 0 | 50 | 50 | 100 |
| C2 | 0 | 0 | 0 | 0 | 50 | 50 | 100 |
| C3 | 0 | 0 | 50 | 100 | 50 | 0 | 200 |
| C4 | 0 | 0 | 50 | 50 | 0 | 0 | 100 |
| C5 | 0 | 100 | 150 | 50 | 0 | 0 | 300 |
| C6 | 0 | 50 | 50 | 0 | 0 | 0 | 100 |

The CRP module then compares the available capacity to the required capacity, and produces a report showing any capacity shortages. A capacity shortage exists in a period in which the requirement for a resource exceeds the available quantity of that resource. If there are no shortages, then the available amount for each capacity resource exceeds the required amount for that capacity resource in each time period, and the parts can be built according to the requirements schedule given in Table 3.

However, it is often the case that the capacity requirement for a resource exceeds the available supply in some period. For this example, the available capacity is specified in the following Table 5.

TABLE 5

Available capacity

| | week 1 | week 2 | week 3 | week 4 | week 5 | week 6 | TOTAL |
|---|---|---|---|---|---|---|---|
| C1 | 0 | 0 | 10 | 30 | 50 | 40 | 130 |
| C2 | 0 | 0 | 10 | 20 | 40 | 50 | 120 |
| C3 | 10 | 30 | 70 | 60 | 40 | 0 | 210 |
| C4 | 40 | 40 | 50 | 50 | 0 | 0 | 180 |
| C5 | 80 | 100 | 90 | 40 | 0 | 0 | 310 |
| C6 | 40 | 40 | 40 | 0 | 0 | 0 | 120 |

Although the total requirements for each resource are less than the total availability for that resource, there are time periods in which the required quantity of a resource exceeds the available quantity of that resource. For example, 50 units of C1 are required in week 6, but only 40 units are available, so there is a shortage of 10 units of C1 in week 6. For this data, the CRP module can compute the shortages and surpluses given in the following Table 6.

TABLE 6

Capacity shortages computed by CRP

| Resource | period | shortage |
|---|---|---|
| C1 | week 6 | 10 |
| C2 | week 5 | 10 |
| C3 | week 4 | 40 |
| C3 | week 5 | 10 |
| C5 | week 3 | 60 |
| C5 | week 4 | 10 |
| C6 | week 2 | 10 |
| C6 | week 3 | 10 |

The capacity shortage report may be used in two ways. If it is possible to increase the supply of a resource, say by adding extra shifts, hiring more workers, or buying or borrowing equipment, the capacity shortage report indicates how much additional capacity should be acquired. If it is not possible to increase the supply of all of the capacities to the required level, a planner may adjust the end product demand, usually by reducing the quantities or moving some portion of the demand to a later period. This revised demand is then analyzed, using the same MRP and CRP modules. This demand revision approach requires considerable time and effort by the planner. In addition, because it relies on the same MRP logic of BOM explosion with fixed offsets, it cannot take advantage of opportunities to use excess capacity to build a product or subassemblies earlier than its required date.

We note that as an alternative to this MRP-based method for determining a feasible production plan, there exist methods based on the mathematical technique known as linear programming. Linear programming techniques can avoid the fixed offset restriction imposed by MRP-based methods by including a separate decision variable to represent the production of each product in each time period. Although such a linear programming based approach can produce extremely good production plans, the computing time and computer memory required for such an approach makes the use of such methods impractical for many manufacturing companies. This situation and its included problem suggest to us a need for a computationally efficient method suitable for determining a production plan that can permit building products and subassemblies prior to the required date.

In response and satisfaction of this need, as summarized above, we have discovered a novel method and system for efficiently generating a feasible production plan in which end products and subassemblies can be built early to allow for effective capacity utilization. The method, in response to a specified requirement q for end product p in period t, may comprise the particular:

(1) analyzing the availability of the capacity resources required to produce p from its subassemblies to determine the maximum quantity $q^*$ less than or equal to q of product p that can be produced from its subassemblies in period t with the available capacity resources;

(2) increasing the planned production of q in period t by the quantity $q^*$;

(3) decreasing the availability of resources by the quantity required to product $q^*$ units of p;

(4) increasing the requirement for p in period t−1 by the quantity $q-q^*$;

(5) repeating steps (1)–(4) for the periods t−1, t−2, . . . ,1, until either the entire demand quantity q has been planned or the beginning of the planning horizon is reached;

(6) exploding the production plan for p to determine the subassembly requirements;

(7) repeating steps (1)–(6) for each of the subassemblies until the bottom of the bill of material is reached.

The information, or input data required for this invention, is the same as the data required by an MRP system: a list of parts, the BOM of each part, the capacity resources requirements for each part (sometimes specified as a bill-of-capacity (BOC) or routing), the available inventory and work in process, and the available capacity. The output, however, differs from typical MRP output, in that rather than simply list shortages (parts and capacity), this invention can produce a production plan that is feasible with respect to the capacity availability. From this production plan, detailed raw material requirements can be produced by BOM explosion. In addition, this invention can be combined with methods that produce a material feasible production plan, to produce a plan that is feasible with respect to both capacity and material availability constraints.

We note, parenthetically, that this method differs from the approach disclosed by Dietrich and Wittrock in U.S. Pat. No. 5,548,518, in that the earlier invention discloses the case where subassemblies of an end product are to be built in exactly the period specified by the production of the end product using that subassembly, and the offset for that subassembly specified on the end product bill of material. The present method, in sharp contrast, can produce production plans in which end products, and more particularly subassemblies of end products, can be built earlier than their required usage dates, to take advantage of available capacity.

The present method is illustrated through the use of the example presented above. The method begins by considering an independent demand, in this example, the demand for P1. In this example we start with the latest time period, and consider the demand for this product in all periods, producing a production plan for P1 before exploding to determine the corresponding requirements for the subassemblies. Other ordering schemes are also possible, and will be commented on at the end of the example.

Examine the availability of resource C1. There is insufficient capacity in week 6, but surplus capacity in weeks 3 and 4. Moving some of the production from week 6 to an earlier week could possibly take advantage of this capacity.

The demand for 50 units of P1 in week 6 requires 50 units of C1 in week 6 and 50 units of C2 in week 6. The available capacity is 40 units of C1 in week 6 and 50 units of C2 in week 6. With this capacity, one can build only 40=min {40, 50} units of P1 in week 6. The production plan for P1 in week 6 is set at 40, the availability or R1 and R2 in week 6 is decreased by 40, and the remaining 10 units of demand are moved earlier one period. The requirement for 50 units in week 5 has been increased to 60 units.

Next, we consider the demand for the 60 units of P1 in week 5, which requires 60 units of C1 in week 5 and 60 units of C2 in week 5. There are 50 units of C1 available in week 5, and 40 units of C2 available in week 5. With this capacity one can build only 40=min {40,50} units of P1 in week 5. The production plan of P1 and the availability of resource R1 and R2 are updated and the remaining 20 units of demand are moved to week 4.

Finally we consider the demand for 20 units of P1 in week 4, which requires 20 units of C1 and 20 units of C2. There are 30 units of C1 available and 20 units of C2 available in week 4, so we can build 20=min {20,30} units of P1 in week 4. Again, the production plan and resource availability is updated. The production plan for P1 is given in the following Table 7.

TABLE 7

Production plan for P1

| | week 1 | week 2 | week 3 | week 4 | week 5 | week 6 |
|---|---|---|---|---|---|---|
| P1 | 0 | 0 | 0 | 20 | 40 | 40 |

This production plan uses resource C1 and C2. The remaining availability of these resources is kept track of and is reported in the following Table 8.

TABLE 8

Remaining availability of C1 and C2

| | week 1 | week 2 | week 3 | week 4 | week 5 | week 6 |
|---|---|---|---|---|---|---|
| C1 | 0 | 0 | 10 | 10 | 10 | 0 |
| C2 | 0 | 0 | 10 | 0 | 0 | 10 |

The next step is to explode this production plan to determine the revised requirements for the P2 and P3. Since some of the production of P1 has moved to earlier time periods, production of the subassemblies used in P1 will also have to move to earlier periods. We can use the standard MRP logic to determine the requirements for P1 and P2, and then analyze these requirements with respect to the available capacity. The revised requirements for P2 and P2 are given in the following Table 9.

TABLE 9

Revised requirements for P1 and P2

| | week 1 | week 2 | week 3 | week 4 | week 5 | week 6 |
|---|---|---|---|---|---|---|
| P2 | 0 | 0 | 20 | 40 | 40 | 0 |
| P3 | 0 | 20 | 40 | 40 | 0 | 0 |

To analyze these requirements with respect to the available capacity, we begin with the latest time period. In each time period we consider the parts P2 and P3 in an arbitrary order.

We first consider the production of P2 in week 5. To produce 40 units of P2 in week 5 requires 40 units of resource C3 in week 5. These 40 units are available, so the 40 units of P2 can be made and are added to the production plan for P2, and the availability of C3 in week 4 is decreased by 40 units.

We next consider the production of P3 in week 4. Producing 40 units of P3 in week 4 requires 40 units of C3 in week 4 and 40 units of C4 in week 4. The available capacity is 60 units of C3 and 50 units of C4, so these 40 units can be produced. The production plan and capacity availability are updated. For convenience, the updated availability of C3 and C4 is shown in the following Table 10.

TABLE 10

Revised availability of C3 and C4

| | week 1 | week 2 | week 3 | week 4 | week 5 | week 6 |
|---|---|---|---|---|---|---|
| C3 | 10 | 30 | 70 | 20 | 0 | 0 |
| C4 | 40 | 40 | 50 | 10 | 0 | 0 |

We next consider the production of P2 in week 4. To make 40 units of P2 in week 4 requires 40 units of resource C3 in week 4. Only 20 units are available. So 20 units of P2 should be made in week 4. The production plan and the resource availability is updated and the remaining 20 units are added to the requirements for P2 in week 3.

The requirement for P2 in week 3 has been increased from 20 to 40 in this last step. Making 40 units of P2 in week 3 requires 40 units of resource C3 in week 3. This entire quantity can be produced since 70 units of C3 are available in week 3, so the production plan for P1 in week 3 is increased by 40. The resource availability is updated; it is displayed in the following Table 11.

TABLE 11

Updated availability of resource C3

| | week 1 | week 2 | week 3 | week 4 | week 5 | week 6 |
|---|---|---|---|---|---|---|
| C1 | 10 | 30 | 30 | 0 | 0 | 0 |

We next consider the production of P3 in week 3. Producing 40 units requires 40 units of C3 and 40 units in C4 in week 3. There are 50 units of C4 available, but only 30 units of C3 remain, so only 30 units of P3 can be produced. The production plan for P3 in week 3 is increased by 30, the resource availability is updated, and the remaining 10 units are added to the requirements for P3 in week 2.

With the addition of 10 units, the requirements for P3 in week 2 is now 30 units, which requires 30 units of resource C3 and 30 units of resource C4. These quantities are available, so the 30 units of P3 can be produced in week 2. The production plan for P3 is updated. The resource availability is updated and displayed in the following Table 12.

TABLE 12

Remaining availability of C2 and C3

| | week 1 | week 2 | week 3 | week 4 | week 5 | week 6 |
|---|---|---|---|---|---|---|
| C3 | 10 | 0 | 0 | 0 | 0 | 0 |
| C4 | 40 | 10 | 20 | 10 | 0 | 0 |

The production plan for P2 and P3 is given in the following Table 13.

TABLE 13

Revised production plan for P2 and P3.

|    | week 1 | week 2 | week 3 | week 4 | week 5 | week 6 |
|----|--------|--------|--------|--------|--------|--------|
| P2 | 0      | 0      | 40     | 20     | 40     | 0      |
| P3 | 0      | 30     | 30     | 40     | 0      | 0      |

In the next step, the revised production plan for P2 and P3 is exploded to determine the requirements for P4 and P5. These requirements are given in the following Table 14.

TABLE 14

Revised requirements for P4 and P5

|    | week 1 | week 2 | week 3 | week 4 | week 5 | week 6 |
|----|--------|--------|--------|--------|--------|--------|
| P4 | 30     | 70     | 60     | 40     | 0      | 0      |
| P5 | 30     | 30     | 40     | 0      | 0      | 0      |

As at the previous level, we begin with the latest time period having a positive requirement. To produce 40 units of P4 in week 4 requires 40 units of resource C5 in week 4. There are 40 units of C4 available, so the 40 units of P4 can be produced in week 4. The production plan for P4 and the availability of C5 is updated.

In week 3, 60 units of C5 are required to produces the 60 units of P3. There are 90 units available, so the entire quantity can be produced. The production plan and the resource availability are updated. The updated availability of C5 is given in the following Table 15.

TABLE 15

Updated availability of resource C5

|    | week 1 | week 2 | week 3 | week 4 | week 5 | week 6 |
|----|--------|--------|--------|--------|--------|--------|
| C5 | 80     | 100    | 30     | 0      | 0      | 0      |

To produce 40 units of P5 in week 3 requires 40 units of C5 and 40 units of C6 in week 3. There are 40 units if C6 available, but only 30 units of C5 remain available, so only 30 units of P5 can be produced in week 3. The remaining 10 units is added to the requirement in week 2.

With the addition of 10 units from week 3, the requirement for P5 in week 2 is 40 units. Producing these 40 units requires 10 units of resource C5 in week 2 and 40 units of resource C6 in week 2. These resources are available, so the 40 units of P5 can be produced in week 2. The updated availability of resources C5 and C6 is given in the following Table 16.

TABLE 16

Updated availability of C5 and C6

|    | week 1 | week 2 | week 3 | week 4 | week 5 | week 6 |
|----|--------|--------|--------|--------|--------|--------|
| C5 | 80     | 60     | 0      | 0      | 0      | 0      |
| C6 | 40     | 0      | 10     | 0      | 0      | 0      |

To produce 70 units of P4 in week 2 requires 70 units of resource CS. Only 60 units of C6 are available, so only 60 units of C6 can be produced. The production plan and the resource availability are updated and the remaining 10 units are added to the requirements in week 1.

With the addition of the 10 units from week 2, a total of 40 units of P4 are required in week 1. Producing these 40 units requires 10 units of resource C5 in week 1. There are 80 units of C5 available in week 1 so the entire 40 units of P4 can be produced. The production plan and the resource availability are updated.

Finally, the production of 30 units of P5 in week 1 requires 30 units of C5 in week 1 and 30 units of C6 in week 1. Both resources are available in the required quantity, so the entire 30 units can be produced. The production plan is updated and given (for both P4 and P5) in the following Table 17.

TABLE 17

Production plan for P5 and P6

|    | week 1 | week 2 | week 3 | week 4 | week 5 | week 6 |
|----|--------|--------|--------|--------|--------|--------|
| P4 | 40     | 60     | 60     | 40     | 0      | 0      |
| P5 | 30     | 40     | 30     | 0      | 0      | 0      |

The availability of resource is updated and is given in the following Table 18.

TABLE 18

Remaining availability of C5 and C6

|    | week 1 | week 2 | week 3 | week 4 | week 5 | week 6 |
|----|--------|--------|--------|--------|--------|--------|
| C5 | 10     | 0      | 0      | 0      | 0      | 0      |
| C6 | 10     | 0      | 10     | 0      | 0      | 0      |

The primary output of this method is the production plan for the parts P1, P2, P3, P4, and P5. Additional outputs could include the usage of each resource in each period as well as the remaining capacity of each of the resources. The production plan is summarized in the following Table 19.

TABLE 19

Feasible production plan for the parts

|    | week 1 | week 2 | week 3 | week 4 | week 5 | week 6 |
|----|--------|--------|--------|--------|--------|--------|
| P1 | 0      | 0      | 0      | 20     | 40     | 40     |
| P2 | 0      | 0      | 40     | 20     | 40     | 0      |
| P3 | 0      | 30     | 30     | 40     | 0      | 0      |
| P4 | 40     | 60     | 60     | 40     | 0      | 0      |
| P5 | 30     | 40     | 30     | 0      | 0      | 0      |

In recapitulation, and as illustrated in the example above, the present method begins with the end product demands. It selects a demand, for each time period it computes how much of that demand can be made in that time period with the available capacity, allocates available capacity to meet that demand, and moves any remaining demand to an earlier time period. Once a feasible production plan for the end product has been determined, that quantity is then exploded one level to determine the requirements for the subassemblies that are used in the end product. The requirements for the subassemblies are then examined one at a time.

Each requirement is given by a part, a time period, and a required quantity. The method can determine how much of the required quantity of the part can be made in the specified period by examining the available capacity. Once this quantity is determined, the required capacity is allocated, and any remaining quantity is moved to an earlier period. Once a feasible production plan for the subassemblies is determined, this plan is exploded one level to determine the requirements for parts that are used in these subassemblies, and the process repeats with these new requirements. When the bottom of the bill-of-materials is reached, and no additional requirements are generated, the method produces the feasible production plan. This plan can then be used for detailed material requirements planning, further examined and modified by a human planner, or can be communicated directly to the manufacturing floor to drive production.

As illustrated in the example, at many steps in the process of determining a feasible production plan, there can be several part time period pairs for which there are positive requirements. The production plan produced from a requirements schedule depends on the order in which the requirements are considered. In one implementation, we consider end product demand one period at a time, starting with the earliest period, and consider the dependent demand one part at a time, starting with the latest period. This allows us to give preference to earlier demands (which are more likely to be of high priority) while affording some computational efficiency while processing the dependent demands. The demands can be considered in any order; cost, revenue, profit, customer priority, or other factors can be used as criteria in ordering the demands. This invention is not limited to the order illustrated or described above.

Although it did not occur in this small example, it is possible that the beginning of the planning horizon can be reached without allocating sufficient capacity to produce the entire demand for a part of subassembly. There are two ways to deal with this situation. One is to follow the MRP example and simply report the unmet requirements. In some cases, particularly if the requirements are for subassemblies that can be purchased, this approach may be acceptable. The second approach is to use the allocation method above in a "feasibility checking" mode to determine whether an entire end product demand q can me met by period t. If it can be met, then the resources are allocated and the production plan is permanently updated. If the demand cannot be met, then some smaller demand quantity q1<q is evaluated. A linear search method (e.g., binary search) is used to find the maximum value q*<=q that can be met by time period t. The resources are allocated to this quantity q*, the production plan is permanently updated by this quantity, and the remaining quantity q-q* is either disregarded, or considered again in some later time period.

Assumptions/Inputs/Notation

We assume that a planning horizon can be partitioned into T planning periods. We denote the planning periods by t=1,2, . . . ,T. These planning periods can be shifts, days, weeks, months, or even years. It is not necessary that the planning periods be of equal length.

Inputs:

Capacity information comprising a list of the capacity resources that will be considered and the amount of each capacity resource that is available in each period. Part number (P/N) information consisting of a list of the P/Ns that will be considered. We assume that the P/Ns are indexed 1,2, . . . ,j so that i<j whenever j is in the BOM of i (that is, whenever j is a subassembly or component of i).

For each P/N BOM data comprising the usage rates and offsets of each part that is required in the production of the P/N.

For each P/N bill-of-capacity BOC or routing information comprising the usage rates and offsets for each capacity resource required in the production of the P/N from its subassemblies. Demand data, comprising a list of demands D, and for each demand D, the P/N p(d) required, and for each period t=1,2, . . . T, the number of units $d_t$ of P/N p(d) required by demand D in period t.

Assumptions:

Capacity which is not used on one period is not available for use in any other period. P/N inventory can be carried from one period to the next with no loss. Raw material availability is not considered as a constraint (although this method can be combined with the method in U.S. Pat. No. 5,548,518 to produce a method which considers raw material constrains and permits building early).

Notation;

J=set of part numbers 1,2, . . . ,J
R=set of capacity resources
D=set of demands
$c_{r,t}$=amount of resource r available in period t
$g_{r,j,s,t}$=quantity of resource r required in period s to produce one unit of P/N j in period t
$a_{i,j,s,t}$=quantity of P/N i required in period s to produce one unit of P/N j in period t
p(d)=P/N required by demand d;
$d_t$=quantity of P/N p(d) required by demand d in period t.

Product yield, component fallout, and re-work ratio are assumed to be incorporated in to the usage rates.

A primary output of the resource allocation method is a production plan that is feasible with respect to the resource availability. We use the following notation:

$x_{i,t}$=quantity of P/N i produced in period t

We let X denote the matrix of production values x it and say that a a plan X is feasible with respect to a capacity availability matrix C if the amount of capacity required is less than or equal to the amount of capacity available for each resource in each period. That is X is feasible with respect to C if an only if the following inequality holds:

$$\sum_{i,t} gr, i, s, tXi, t <= Cr, s$$

Figure 3:
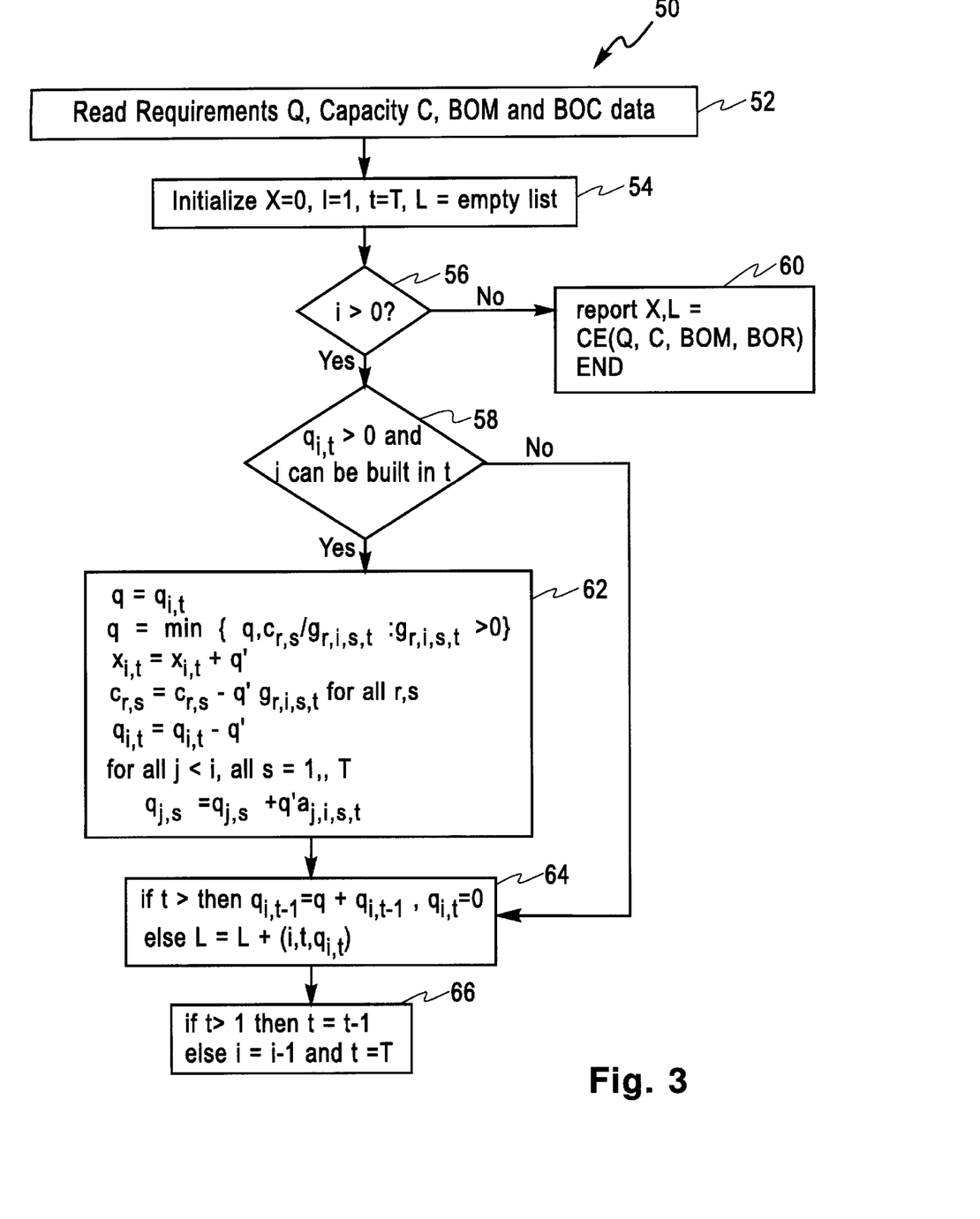
FIG. 3 comprises a capacitated Explosion Algorithm that is important in producing a production plan.
Figure 4:
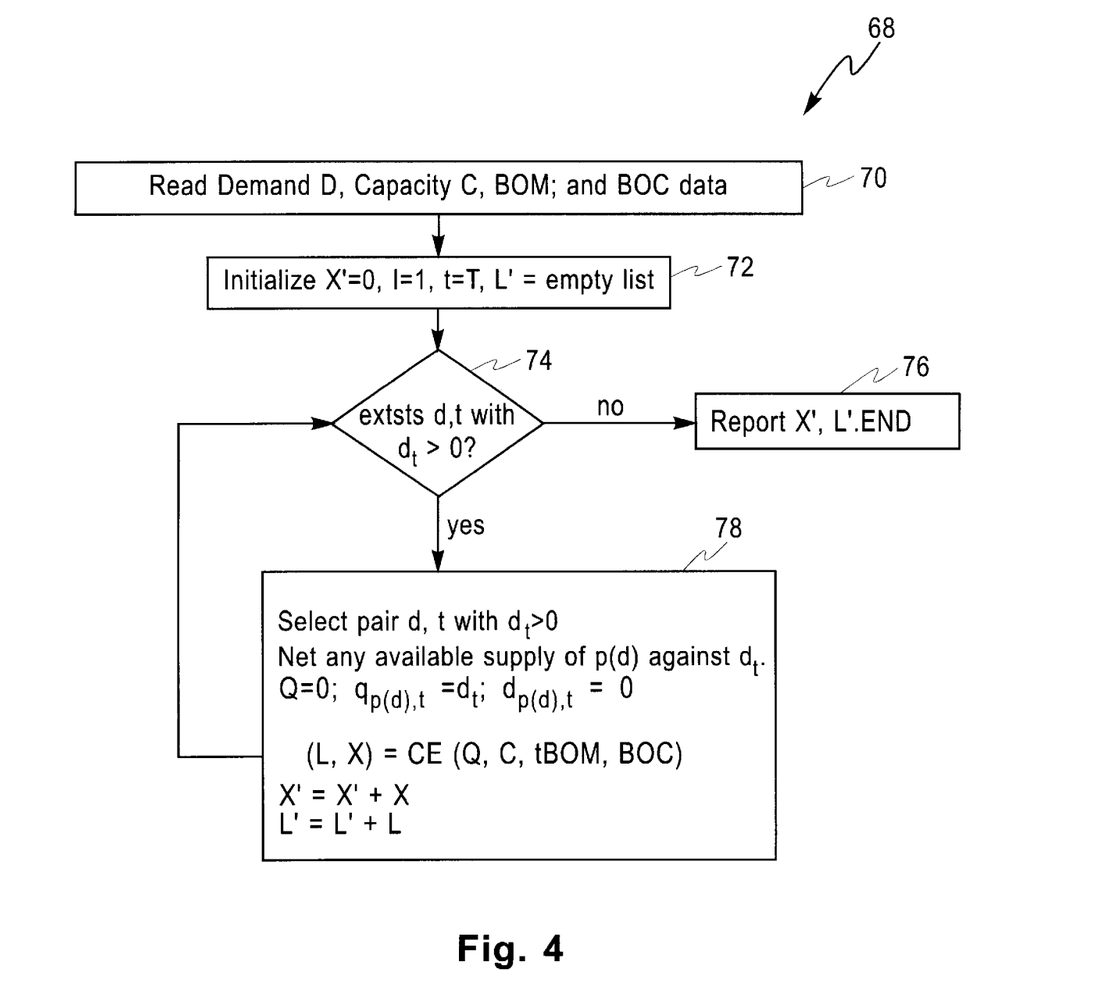
FIG. 4 comprises a capacity Allocation Algorithm that may be used in realization of the present invention.
Figure 5:
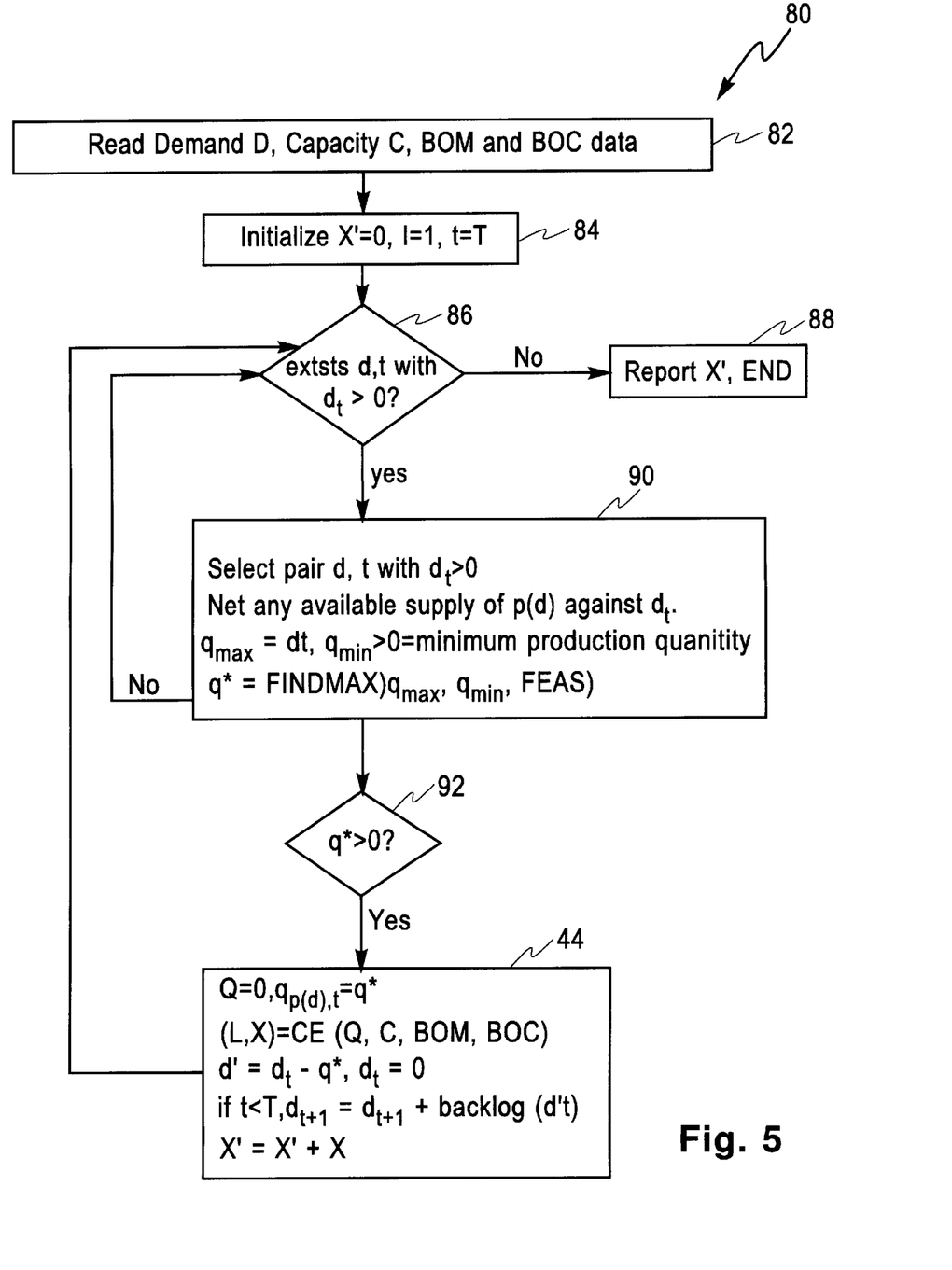
FIG. 5 comprises an alternative Capacity Allocation algorithm that may be used in realization of the present invention.

A schematic of the method is given in FIG. 3. In describing this new method of capacity allocation, we first describe a step which is repeated throughout the algorithm. We call this step capacitated explosion. Capacitated explosion makes use of a requirements matrix Q in which the element $q_{j,t}$ gives the requirements for P/N j in period t.

Capacitated Explosion:

Inputs: A requirements matrix Q and a resource availability matrix C, BOM and BOC data.

Output: A production plan X that is feasible with respect to C, and a remaining requirements list L that gives triples (p, t, q) indicating the additional quantity q of P/N p that must be obtained in period t meet the requirements schedule.

Method: (L, X)=CE(Q, C, BOM, BOC)

Step 1: Initialize: X=0, i=1, t=T, L=empty list; Do while i>0;

Step 2: If q=$q_{i,t}$=0 or i can not be built in period t then go to step 8, otherwise go to step 3.

Step 3: Determine the maximum quantity q'<=q or P/N i that can be produced in period t with the available resources: q'=min {q, $c_{r,s}/g_{r,i,s,t}$:$g_{r,i,s,t}$>0 }

Step 4: Update the production plan by increasing the production of i in t by q': $x_{i,t}$=$x_{i,t}$+q'

Step 5: Update the capacity availability by reducing the capacity of each resource used by i in t by the required quantity q' $g_{i,r,s,t}$: $c_{r,s}$=$c_{r,s}$-q' $g_{r,i,s,t}$ for all r in R and all s=1, . . . ,T Step 6: Reduce the requirement for i in t by q': $q_{i,t}$=$q_{i,t}$-q'

Step 7: Explode the quantity q' to determine the quantity of each subassembly required to produce q' units of i. Update the requirements matrix: $q_{j,s}$=$q_{j,s}$+q' $a_{j,i,s,t}$ for all j and s.

Step 8: If possible, move the remaining requirements for i to an earlier period: if t>1 then update $q_{i,t-1}=q_{i,t-1}+q_{i,t}$, $q_{i,t}=0$
Step 8: Update t: if t>1 then set t=t−1 and go to step 2.
Step 9: (t=1) if i<J then set i=i+1 and set t=T and go to step 2.
Step 10: (T=1, i=J) compute the remaining requirements list: $L=L+\{(i, t, q_{i,t}): q_{i,t}>0\}$ In this implementation, we explode the individual quantities q' whenever they are non zero. A more computationally efficient implementation would wait until the entire production plan for the part i had been computed (e.g., t=1) and explode each of the elements x it at that time. In other words, Step 7 above would be eliminated, and the Step 9 would be replaced by Step 9'.

Step 9': (t=1) Explode the quantities $x_{i,u}$, u=1, . . .T to determine the quantity of each subassembly required to produce $x_{i,s}$ units of i in period s. Update the requirements matrix:

$$qj,s = qj,s + \sum_{u=1,...T} xi, uaj, i, su.$$

We further note that if there is a available supply of end products or subassemblies, this supply can be netted for the requirements q prior to executing Step 3, or immediately following step 9 or 9'. Only the remaining requirement, that which has to be built, is limited by the capacity constraints.

With the capacitated explosion method having been described, we now proceed to describe two preferred implementations of the capacity allocation method. The first implementation uses capacitated explosion to produce a feasible production plan and a list of additional requirements. This production plan will meet all of the original demands on time, but may require purchasing additional subassemblies.

Capacity Allocation Method 1
Inputs: The demand D, the capacity C, the BOM and BOC data
Outputs: A production plan X' and a requirements list L'
Method:
Step 1: Initialize the production scheduled X'=0, L'=empty list; Do while there exits a pair d,t with $d_t>0$.
Step 2: Select a pair d,t with $d_t>0$. If no such pair exists, report (X', L') and end.
Step 3: Net any available supply of P/N p(d) against the demand quantity $d_t$.
Step 4: Initialize the requirements matrix Q=0. Set $q_{p(d),t}=d_t$.
Step 5: Set $d_t=0$.
Step 6: Use capacitated explosion method to compute (L,X)=CE(Q,C, BOM, BOC). The availability matrix C is updated in this step.
Step 7: Increase the production plan X' by X to include the production required to meet the demand. X'=X'+X.
Step 8: Add any new remaining requirements to the requirements list: L'=L+L'.

If a production plan does not require the purchase of any additional parts to satisfy a demand, we say the production plan is fully feasible with respect to that demand. If L is empty, then the plan produced by the capacitated explosion method is fully feasible. The second implementation uses capacitated explosion together with a linear search procedure to produce a feasible production plan. The production plan produced by the second method will not require the purchase of any additional parts, but may not produce all of the demand, or may produce some of it later than required.

It is well known that for any pair of numbers $q_{min}$, $q_{max}$, with $q_{min}<q_{max}$ and any monotone feasibility procedure FEAS, which returns the values TRUE or FALSE, a linear search, for example a binary search, can be used to determine the maximum value q, $q_{min}<=q<=q_{max}$ for which FEAS(q) is TRUE. In method 2, any linear search procedure can be used. As these procedures are well documented in the literature (see U.S. Pat. No. 5,548,518 for an example), we do not display one here, but rather assume the existence of a linear search procedure FINDMAX that uses the feasibility procedure based on capacitated explosion, shown below. Our only requirements are that FINDMAX return the value 0 if the minimum quanty $q_{min}$ is infeasible, and that FINDMAX use only temporary copies of the data in C and X and not alter the actual data in any way.

Feasibility procedure: FEAS
Input: P/N p, time period t, quantity $q_{test}$, Capacity data C, BOM, BOC
Output: TRUE or FALSE
Method:
Step 1: Initialize a requirements matrix Q: Q=0, $q_{p,t}=q_{test}$
Step 2: Use capacity explosion to compute (L,X)=CE(Q,C, BOM, BOC).
Step 3: if L=empty list return TRUE, else return FALSE Method 2 also uses a backlogging function to move unmet demand in a period to a later period. The simplest backlogging function is obtained by setting backlog(q,t)=0 for all values of q, and t; that is, to simply disregard any unmet demand. A commonly used backlogging function is backlog (q,t)=q; that is, moving all of the unmet demand into the next period. Or a portion of the demand can be moved, and the rest disregarded. The choice of backlog function is dependent on the nature of the product being produced. This invention is not restricted to any particular choice of backlog functions.

Capacity Allocation Method 2
Inputs: The demand D, the capacity C, the BOM and BOC data
Outputs: A production plan X'
Method:
Step 1: Initialize the production scheduled X'=0, Do while there exists a pair d,t with $d_t>0$.
Step 2: Select a pair d,t with $d_t>0$. If no such pair exists, report X' and end.
Step 3: Net any available supply of P/N p(d) against the demand quantity $d_t$.
Step 4: set $q_{max}=d_t$ and let $q_{min}>0$ be the minimum production quantity.
Step 5: q*=FINDMAX($q_{max}$, $q_{min}$, FEAS)
Step 6: if q*=0 the go to Step 2, otherwise initialize the requirements matrix Q=0. Set $q_{p(d),t}=q^*$.
Step 7: Use capacitated explosion method to compute (L,X)=CE(Q,C, BOM, BOC). The availability matrix C is updated in this step.
Step 8: Update demand by computing the remaining quantity d'=$d_t$−q*, setting $d_t$=0, and, if t<T, setting $d_{t+1}=d_{t+1}$+ backlog(d', t).
Step 9: Increase the production plan X' by X to include the production required to meet the demand. X'=X'+X.

Figure 1:
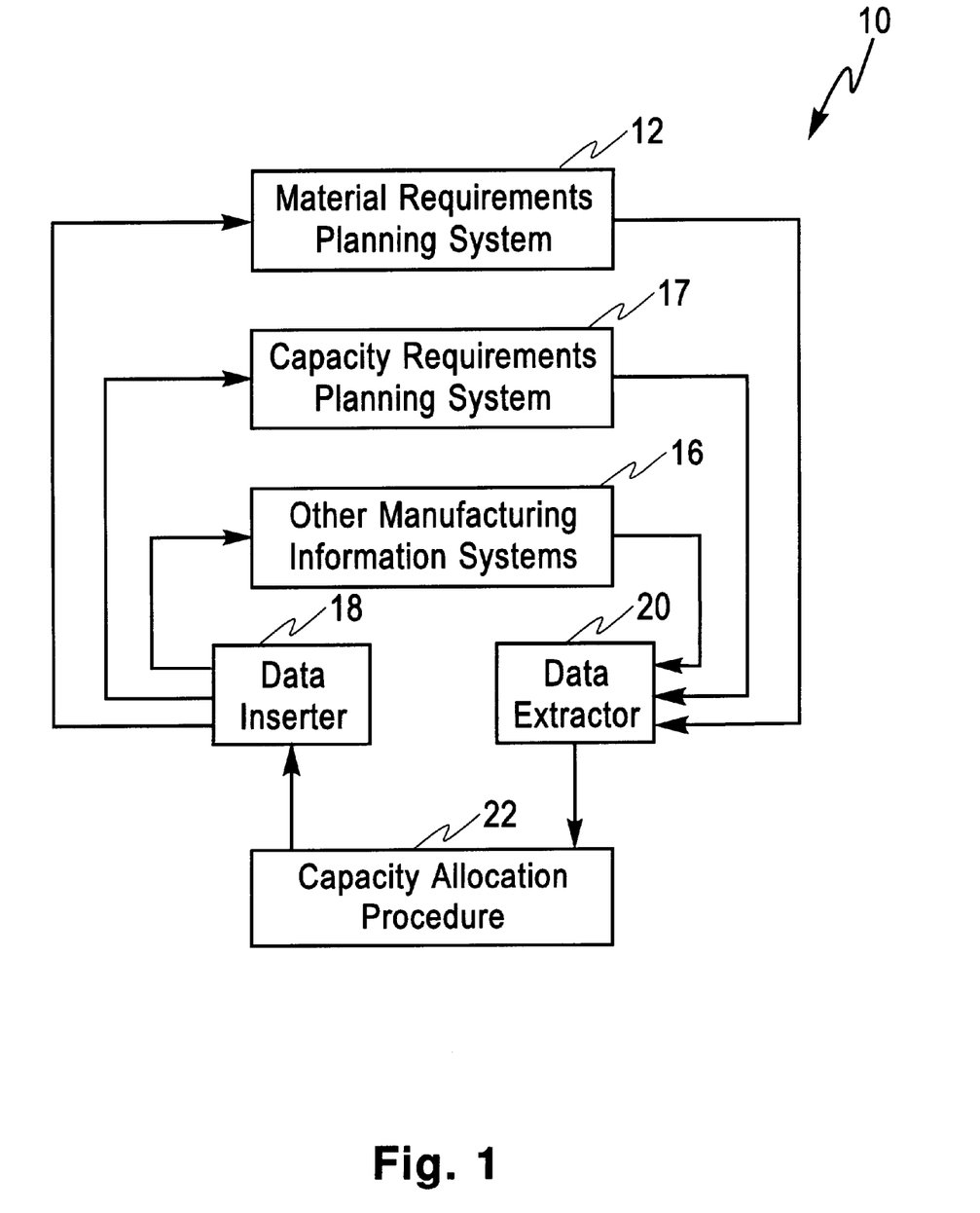
FIG. 1 shows a block diagram for providing capacity allocation.
Figure 2:
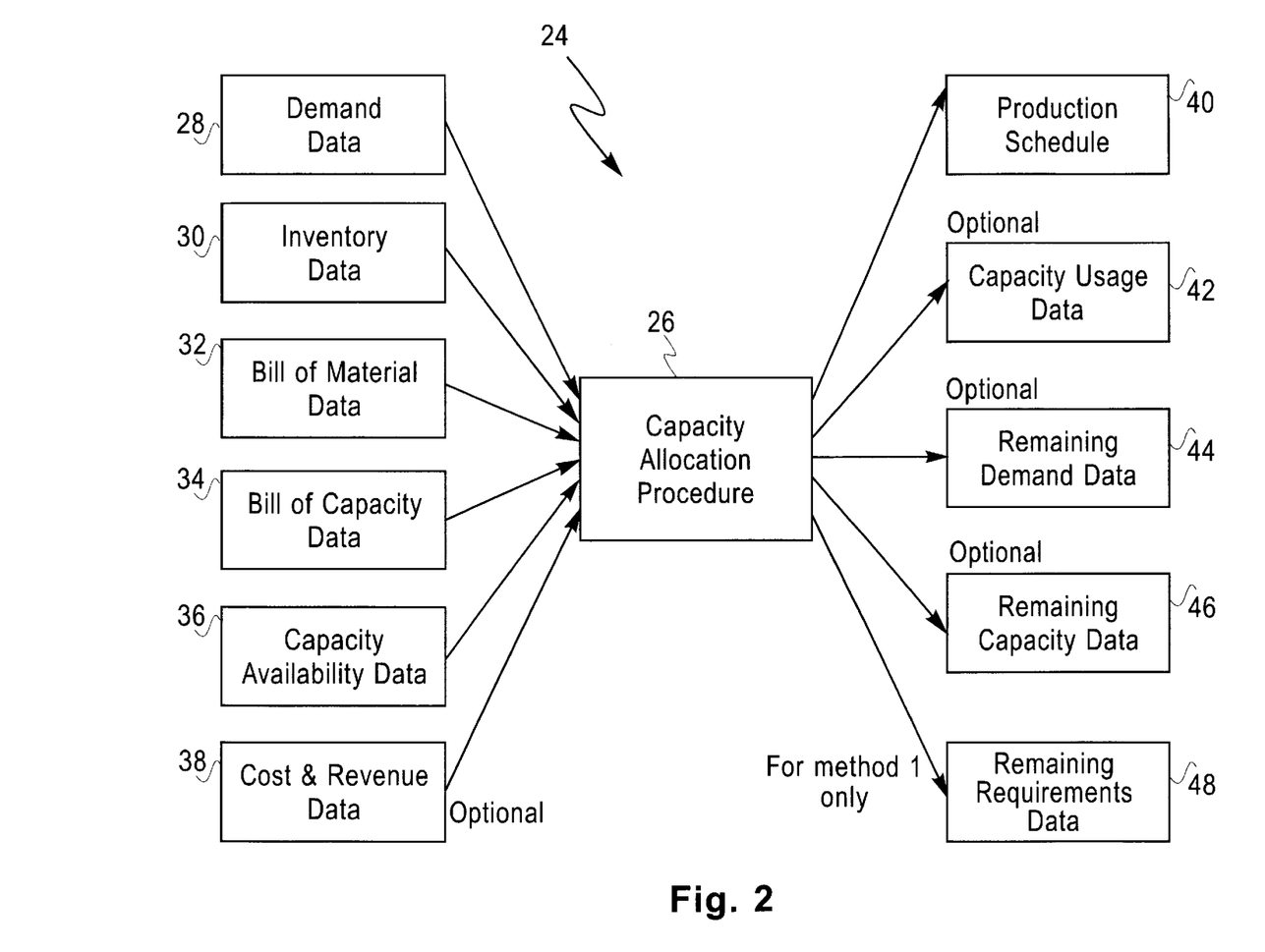
FIG. 2 comprises a schematic showing a flow of data for the FIG. 1 diagram.

Attention is now directed to FIG. 2 which provides illustration for realization of the novel method by way of machine or computer implementation. In particular, FIG. 2 conceptually shows a conventional computer 26 for realizing the present invention. The computer 26 comprises input comprising e.g., demand data 28, inventory data 30, BOM data 32 etc. The CPU 26 can operate on these inputs according to the procedures and methods above recited, for generating outputs of a type represented by e.g., a production schedule 40, a capacity usage data 42 etc.

We claim:

1. A computer implemented method suitable for producing a production plan for assembled products, at least one of said products having a multi-level assembly structure, that is feasible with respect to capacity availability, the method comprising:

(1) reading an end product demand and capacity availability information;

(2) selecting a specific demand derived from the end product demand and comprising an end product, a time period, and a quantity;

(3) determining whether the quantity can be produced in the time periods using the available capacity and surplus capacity from earlier periods; and (4) recording the amount of capacity used in each time period to produce this quantity, thereby enabling realization of the end product demand when an imbalance of demand and capacity exists, wherein said determining, without use of linear programming, determines a maximum quantity of assembled product demand that can be produced, and wherein said end product demand includes a plurality of end products produced using a plurality of resources allocated thereto.

2. The method according to claim 1, wherein said reading further comprises reading material availability information and said recording further comprises recording the amount of each material used in each period.

3. The method according to claim 1, wherein the end product demand comprises at least one of multiple end products and multiple time periods.

4. The method according to claim 1, further comprising repeating said reading, said selecting, said determining, and said recording operations.

5. The method according to claim 1, further comprising determining the maximum quantity of the end product demand that can be produced by searching.

6. The method according to claim 5 in which the determining in claim 5 is repeated for a plurality of demands.

7. The computer implemented method, as claimed in claim 1, wherein the end product demand is selected for one or more time periods, wherein said determining includes:
 computing how much of said end product demand can be produced in said one or more time periods with an available capacity;
 allocating capacity to meet said end product demand in said one or more time periods; and
 shifting any remaining capacity in said one or more time periods to an earlier time period.

8. The computer implemented method, as claimed in claim 1, wherein requirements of a subassembly portion of said end product are determined after producing the feasible production plan for said end product.

9. The computer implemented method, as claimed in claim 8, wherein said determining attempts to variably produce the required quantity of said end product and of said subassembly portion in an earlier time period prior to said time period of said end product demand.

10. An allocation method for utilization within a computer for generating a feasible production plan for assembled products, at least one of said products having a multi-level assembly structure, the computer implemented method comprising:

(1) reading an end product demand comprising a part number p, a quantity q, and a time period t, and reading capacity availability information for periods 1 through t;

(2) determining a planned quantity of production q'(t) less than or equal to the quantity q of the part number p that can be produced in the period t from subassemblies with available capacity;

(3) updating the capacity by subtracting the capacity required to produce this planned quantity;

(4) if possible, moving any remaining requirement q−q' to successively earlier periods;

(5) repeating said determining and said updating until time t is exhausted thereby computing q'(t−1), q'(t−2), . . . q'(1);

(6) exploding the planned quantities of production q'(t), q'(t−1), . . . ,q'(1) of p through the bill of material of p to determine the requirements for each of the subassemblies p' of p in each time period t';

(7) repeating 1–5 above for each part p' used in p and each time period t' until all requirements have been satisfied or no additional production is possible; and (8) reporting whether the quantity q can be produced by period t, wherein said determining, without use of linear programming, determines a maximum quantity of assembled product demand that can be produced, and wherein said end product demand includes a plurality of end products produced using a plurality of resources allocated thereto.

11. The method according to claim 10, wherein said reading further comprises reading material availability information and said exploding further comprises netting material availability.

12. The method according to claim 10, wherein the end product demand comprises at least one of multiple end products and multiple time periods.

13. The method according to claim 10, further comprising repeating 1 through 8.

14. The method according to claim 10, further comprising determining the maximum quantity of the end product demand that can be produced by searching.

15. The method according to claim 14, repeated for a plurality of demands.

16. The allocation method, as claimed in claim 10, wherein the end product demand is selected for one or more time periods, wherein said determining includes:
 computing how much of said end product demand can be produced in said one or more time periods with an available capacity;
 allocating capacity to meet said end product demand in said one or more time periods; and
 shifting any remaining capacity in said one or more time periods to an earlier time period.

17. A computer implemented method suitable for producing a production plan for assembled products, at least one of said products having a multi-level assembly structure, that is feasible with respect to capacity availability, the method comprising:

(1) reading an end product demand and capacity availability information;

(2) selecting a specific demand derived from the end product demand and comprising an end product, a time period, and a quantity;

(3) determining a quantity less than or equal to the demand quantity that can be produced in the time periods using the available capacity and surplus capacity from earlier periods;

(4) recording the amount of capacity used in each time period to produce this quantity; and (5) recording any additional subassemblies or parts that are required to produce this quantity, thereby enabling realization of end product demand when an imbalance of demand and capacity exists, wherein said determining, without use of linear programming, determines a maximum quantity of assembled product demand that can be produced, and wherein said end product demand includes a plurality of end products produced using a plurality of resources allocated thereto.

18. The computer implemented method, as claimed in claim 17, wherein the end product demand is selected for one or more time periods, wherein said determining includes:

computing how much of said end product demand can be produced in said one or more time periods with an available capacity;

allocating capacity to meet said end product demand in said one or more time periods; and shifting any remaining capacity in said one or more time periods to an earlier time period.

19. A system suitable for producing a production plan for assembled products, at least one of said products having a multi-level assembly structure, that is feasible with respect to capacity availability, the system comprising:

(1) means for reading an end product demand and capacity availability information;

(2) means for selecting a specific demand derived from the end product demand and comprising an end product, a time period, and a quantity;

(3) means for determining whether the quantity can be produced in the time periods using the available capacity and surplus capacity from earlier periods; and (4) means for recording the amount of capacity used in each time period to produce this quantity, thereby enabling realization of end product demand when an imbalance of demand and capacity exist, wherein said means for determining, without use of linear programming, determines a maximum quantity of assembled product demand that can be produced, and wherein said end product demand includes a plurality of end products produced using a plurality of resources allocated thereto.

20. The system, as claimed in claim 19, wherein the end product demand is selected for one or more time periods, wherein said means for determining includes:

means for computing how much of said end product demand can be produced in said one or more time periods with an available capacity;

means for allocating capacity to meet said end product demand in said one or more time periods; and means for shifting any remaining capacity in said one or more time periods to an earlier time period.

* * * * *